(12) United States Patent
De Lepine

(10) Patent No.: US 10,326,332 B2
(45) Date of Patent: Jun. 18, 2019

(54) ELECTRIC MACHINE

(71) Applicant: GE Energy Power Conversion Technology Ltd., Rugby, Warwickshire (GB)

(72) Inventor: Xavier De Lepine, Ville en Vermois (FR)

(73) Assignee: GE ENERGY POWER CONVERSION TECHNOLOGY LTD., Rugby (GB)

( * ) Notice: Subject to any disclaimer, the term of this patent is extended or adjusted under 35 U.S.C. 154(b) by 683 days.

(21) Appl. No.: 13/747,750

(22) Filed: Jan. 23, 2013

(65) Prior Publication Data

US 2013/0207495 A1    Aug. 15, 2013

(30) Foreign Application Priority Data

Jan. 24, 2012   (FR) ..................................... 12 50673

(51) Int. Cl.
| | | |
|---|---|---|
| *H02K 7/09* | (2006.01) | |
| *F16C 32/06* | (2006.01) | |
| *F16C 32/04* | (2006.01) | |
| *F16C 39/02* | (2006.01) | |
| *H02K 7/08* | (2006.01) | |

(52) U.S. Cl.
CPC ........... *H02K 7/09* (2013.01); *F16C 32/0436* (2013.01); *F16C 32/0442* (2013.01); *F16C 39/02* (2013.01); *F16C 2380/26* (2013.01); *H02K 7/083* (2013.01)

(58) Field of Classification Search
CPC .......... H02K 7/09; H02K 7/083; F16C 32/06; F16C 39/041; F16C 39/02; F16C 32/0442; F16C 32/04–32/0438; F16C 32/044; F04D 29/059; F04D 29/058
USPC .................................................. 310/90, 90.5
See application file for complete search history.

(56) References Cited

U.S. PATENT DOCUMENTS

| | | | |
|---|---|---|---|
| 3,811,740 A | | 5/1974 | Sacerdoti et al. |
| 5,302,874 A | * | 4/1994 | Pinkerton ............. F16C 32/044 |
| | | | 310/90.5 |
| 5,310,311 A | | 5/1994 | Andres et al. |

(Continued)

FOREIGN PATENT DOCUMENTS

| | | |
|---|---|---|
| EP | 0 594 033 A2 | 4/1994 |
| WO | 9939424 A1 | 8/1999 |
| WO | 0207289 A2 | 7/2001 |

OTHER PUBLICATIONS

First Office Action and Search issued in connection with corresponding CN Application No. 201380006598.9 dated Jan. 4, 2016.

(Continued)

*Primary Examiner* — Thomas Truong
*Assistant Examiner* — Leda Pham
(74) *Attorney, Agent, or Firm* — Wood IP LLC

(57) ABSTRACT

An electric machine, for example, a motor, is provided. The machine or motor includes a stator, a rotor, at least one main bearing for supporting the rotor relative to the stator in a main range of speeds and at least one secondary bearing suitable for supporting the rotor relative to the stator when the first main bearing is faulty. Each secondary bearing is a passive electrodynamic bearing and includes at least one permanent magnet and a moveable electric conductor element.

17 Claims, 2 Drawing Sheets

(56) References Cited

U.S. PATENT DOCUMENTS

| | | | | |
|---|---|---|---|---|
| 5,345,128 | A | | 9/1994 | Pinkerton et al. |
| 5,525,848 | A | | 6/1996 | Pinkerton et al. |
| 5,739,609 | A | * | 4/1998 | Ueyama .............. F16C 32/0442 |
| | | | | 310/90.5 |
| 5,834,867 | A | * | 11/1998 | Kikuchi .................. G01M 1/30 |
| | | | | 310/103 |
| 6,353,273 | B1 | * | 3/2002 | Heshmat ............... F16C 17/024 |
| | | | | 310/90.5 |
| 2004/0022653 | A1 | * | 2/2004 | Brunet ................ F16C 32/0442 |
| | | | | 417/423.5 |
| 2004/0090138 | A1 | | 5/2004 | Amrhein et al. |
| 2004/0189124 | A1 | * | 9/2004 | Baudelocque ........... C12N 9/93 |
| | | | | 310/90.5 |
| 2007/0269153 | A1 | * | 11/2007 | Sekimoto ................ F16C 33/62 |
| | | | | 384/446 |
| 2011/0052109 | A1 | * | 3/2011 | Tecza ..................... F16C 32/06 |
| | | | | 384/101 |

OTHER PUBLICATIONS

Notification to Grant issued in connection with corresponding CN Application No. 201380006598.9 dated Jun. 28, 2016.
Extended European Search Report and Opinion issued in connection with corresponding EP Application No. 13152240.1 dated Dec. 2, 2016.

* cited by examiner

ELECTRIC MACHINE

Priority is hereby claimed to French Patent Application No. 12 50673 filed on Jan. 24, 2012, the entire disclosure of which is hereby incorporated by reference herein.

The present invention relates to an electric machine or motor including a stator, a rotor and at least one first main bearing suitable for supporting the rotor relative to the stator. The first main bearing may be an active magnetic bearing.

BACKGROUND

Such electric motors comprising main bearings which are active magnetic bearings are known in order to support the rotor in rotation relatively to the stator.

These motors also comprise for each main bearing, an auxiliary bearing suitable for supporting the rotor relatively to the stator when the associated main bearing is faulty.

The auxiliary bearings used in the state of the art only operate in a given range of speeds, i.e. a range of relatively low speeds. The auxiliary bearings are bearings with rolling elements, as an alternative to smooth bearings.

However, bearings with rolling elements do not allow the use of motors under specific environmental conditions, for example in the case of environments sensitive to pollution.

Moreover, the bearings with rolling elements only have a relatively limited lifetime.

SUMMARY OF THE INVENTION

An object of the invention is to overcome at least one of the drawbacks above. An object of the present invention may provide an electric motor which allows use in a pollution-sensitive environment and/or which has a reliable operation.

The present invention provides an electric motor including a stator, a rotor, at least one first main bearing suitable for supporting the rotor relative to the stator in a main range of speeds and at least one first secondary bearing suitable for supporting the rotor relative to the stator when the first main bearing is faulty, the at least one secondary bearing being a passive electrodynamic bearing including at least one permanent magnet and a moveable electric conductor element. The at least one first main bearing may be an active magnetic bearing.

According to particular embodiments, the electric machine according to the invention may include one or more of the following features:

- a second main bearing, notably a magnetic bearing, suitable for supporting the rotor relatively to the stator in the main range of speeds, and a second secondary bearing suitable for supporting the rotor relatively to the stator when the second main bearing is faulty;
- said or each secondary bearing is suitable for supporting the shaft in a secondary range of speeds, and the secondary range of speed is delimited by a stability threshold speed as a low limit;
- a first auxiliary bearing which is associated with the first main bearing and/or if necessary a second auxiliary bearing which is associated with the second main bearing, and said or each auxiliary bearing is suitable for supporting the rotor relatively to the stator in an auxiliary range of speeds, different from the main range of speeds, notably for which the upper limit of the auxiliary range of speeds is greater than or equal to the stability threshold speed;
- said or each auxiliary bearing is a smooth bearing;
- the smooth bearing either comprises a bearing ring, and notably consists of a bearing ring, or is a bearing with pads;
- said or each auxiliary bearing comprises at least one bearing with rolling elements;
- said or each secondary bearing comprises a crown attached to the rotor and two fixed elements relatively to the stator, the crown comprises the electric conductor element or consists of the electric conductor elements, and each fixed element includes one of the permanent magnets;
- both fixed elements are positioned on either side of the associated crown;
- at least one of the fixed elements axially covers the associated auxiliary bearing;
- each auxiliary bearing is offset from the secondary bearing so that the bearing ring of the relevant auxiliary bearing is axially offset from all the fixed elements.

BRIEF DESCRIPTION OF THE DRAWINGS

The present invention will be better understood upon reading the description which follows, only given as an example and made with reference to the drawings, wherein.

DETAILED DESCRIPTION

Figure 1:
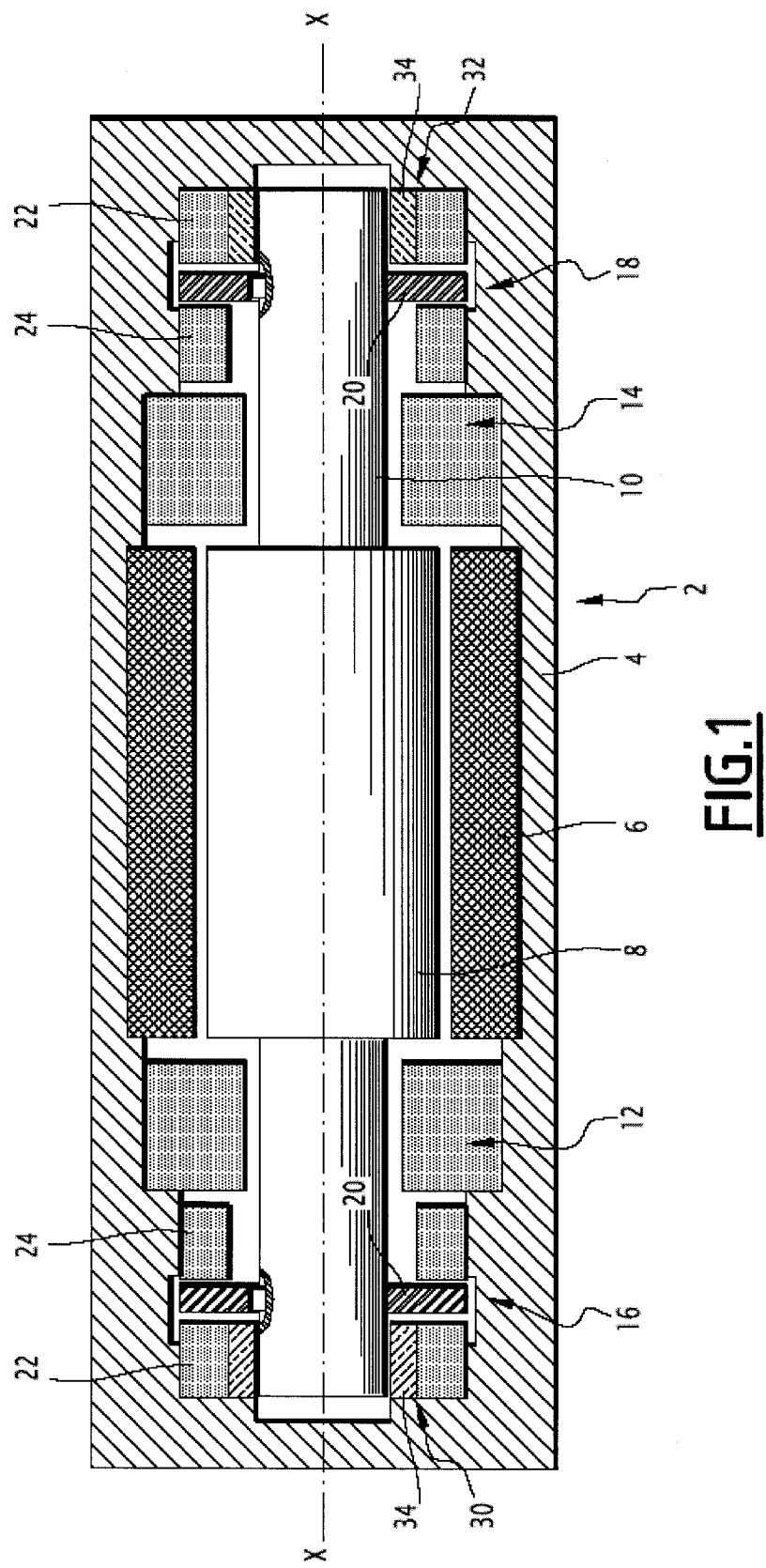
FIG. 1 schematically shows an electric motor according to the present invention in an axial sectional view.

FIG. 1 shows an electric machine, for example, an electric motor according to the present invention, designated by the general reference 2.

The motor 2 is for example an asynchronous motor. The electric motor 2 is a motor having a very high rated speed of rotation. The rated speed of rotation may for example be greater than 5,000 revolutions/minute and may be greater than 10,000 revolutions/minute.

The electric motor 2 comprises a casing 4, a stator 6, a rotor 8 and a shaft 10.

The rotor 8 and the shaft 10 are housed in the casing 4 rotation around an axis of rotation X-X. In the following, the expressions of "axially", "radially", and "circumferentially" will be used with respect to the axis of rotation X-X. The specific axes of the elements described hereafter are considered to be coaxial with the axis of rotation, unless indicated otherwise.

The shaft 10 and the rotor 8 taken together have a mass which is greater than 300 kg and for example, particularly greater than 750 kg.

The electric motor 2 also comprises a first main bearing 12 and a second main bearing 14.

The first and second main bearings 12, 14 are identical and support the rotor 8 relative to the stator 6 rotating around the axis X-X. Both main bearings 12, 14 are axially positioned on either side of the rotor 8. The first main bearing 12 and the second main bearing 14 each are an active magnetic bearing. An active magnetic bearing is a bearing that includes electromagnets which are powered with electric currents and continuously servo-controlled in order to center the shaft 10 and the rotor 8 relatively to the axis of rotation X-X.

The first and second main bearings 12, 14 support the shaft in a main range of speeds. This main range of speeds is for example delimited by 0 rpm. The main range of speeds is also delimited by the rated speed of rotation of the electric motor 2 or by a speed greater than this rated speed of rotation (overspeed, other speed).

The electric motor 2 also comprises a first secondary bearing 16 and a second secondary bearing 18. The first secondary bearing 16 is suitable for supporting the rotor 8 relative to the stator 6 when the first main bearing 12 is faulty. The second secondary bearing 18 is suitable for supporting the rotor 8 relative to the stator 6 when the second main bearing 14 is faulty. Each of the first and second secondary bearings 16, 18 is therefore a bearing, the function of which corresponds to that of a landing bearing, without however being a landing bearing, strictly speaking, given that there is no physical contact created between the shaft 10 and the secondary bearing 16, 18 when the secondary bearings support the shaft.

Both secondary bearings 16, 18 are axially positioned on either side of the rotor 8.

Both secondary bearings 16, 18 are identical and subsequently only one of the secondary bearings 16, 18 will be described.

The secondary bearing 16, 18 is an electrodynamic bearing. An electrodynamic bearing is a passive bearing, i.e. it operates without any outer supply of electricity.

The secondary bearing 16, 18 comprises a crown 20 and two fixed elements 22, 24.

The crown 20 is fixed in rotation and in translation to the shaft 10 and therefore to the rotor 8. The crown 20 is therefore a rotary crown. The crown 20 includes an electric but amagnetic or slightly magnetic conductor element. For example it is in metal or in a lightweight alloy, such as aluminum.

Each fixed element 22, 24 is fixed relatively to the stator 6 and is attached to the casing 4. Each fixed element 22, 24 is a permanent magnet.

The properties of the permanent magnet/conductor pair determines the operating range of the electrodynamic bearing. The direction of the circulation currents depends on the speed of rotation. This direction determines the stability threshold described hereafter. An electrodynamic bearing is a passive magnetic bearing combining permanent magnets with circulation currents (eddy currents) generated in the conductor elements of the crown 20.

Both fixed elements 22, 24 are positioned on either side of the crown 20 considered along the axis of rotation X-X. Both fixed elements 22, 24 radially cover the crown 20.

The secondary bearing 16, 18 defines a secondary range of speeds in which it is suitable for supporting the rotor 8 and the shaft 10 relatively to the casing 4. This secondary range of speeds is for example delimited upwards by the upper speed limit of the main range of speeds, by the rated speed of the electric motor 2 or a speed greater than this rated speed. The secondary range of speeds is delimited downwards by a stability threshold speed of the secondary bearing 16, 18. The stability threshold speed is strictly greater than 0 rpm and is for example comprised between 1,000 rpm and 10,000 rpm.

The electric motor 2 also comprises a first auxiliary bearing 30 and a second auxiliary bearing 32. The first auxiliary bearing 30 is associated with the first main bearing 12 while the second auxiliary bearing 32 is associated with the second main bearing 14.

Each of the first and second auxiliary bearings 30, 32 is suitable for supporting the rotor 8 and the shaft 10 relative to the stator 6 when the first main bearing 12 or the second main bearing 14 is faulty, and when the secondary bearings 16, 18 no longer support the shaft 10 given that the speed of rotation is less than the stability threshold speed. Each of the first and second auxiliary bearings 30, 32 is therefore a landing bearing. Each of the auxiliary bearings 30, 32 is a landing bearing with a low speed of rotation when the speed of rotation is less than the stability threshold speed of the secondary bearing.

The first auxiliary bearing 30 and the second auxiliary bearing 32 are for example smooth bearings. Each smooth bearing comprises a bearing ring 34 and notably consists of this bearing ring 34. The smooth bearing may also be a bearing with pads. In this case, the pads are formed by annular segments. The bearing ring 34 or the pads are for example in copper or in an alloy based on copper, or in a plastic material for example based on PEEK (polyetheretherketone). The ring 34 or the pads may also be in a composite material, such as comprising glass, carbon or PEEK fibers.

Each auxiliary bearing 30, 32 is suitable for supporting the shaft 10 in an auxiliary range of speeds which is different from the main range of speeds.

The auxiliary range of speeds is also different from the second range of speeds. Generally, the auxiliary range of speeds is less than the secondary range of speeds, but it may overlap the secondary range of speeds. The auxiliary range of speeds comprises speeds less than the stability threshold speed of the associated secondary bearing 16, 18. The auxiliary range of speeds is for example comprised between 0 rpm and a speed equal to or greater than the stability threshold speed (lower speed limit of the secondary bearings). Thus, there is an overlap of speeds between the auxiliary range of speeds and the secondary range of speeds. Thus, when there is a failure of the main bearings 12, 14, regardless of the speed of rotation, which is decreasing, the rotor 8 and the shaft 10 will be supported by the secondary bearings and by the auxiliary bearings until they stop.

The auxiliary bearings 30, 32 each have an operating range of speeds less than the range of speeds of the secondary bearings 16, 18. The upper limit of this auxiliary range of speeds of the auxiliary bearings 30, 32 is equal to or greater than the lower limit of the range of speeds of the secondary bearings.

One or both fixed elements 22, 24 axially cover the associated auxiliary bearings 30, 32. In the case illustrated in the figure, it is the element 22 which axially covers the auxiliary bearing 30, 32. Thus, the dimensions of the motor 2, for a given power, are relatively small.

The electric motor 2 according to the invention operates in the following way.

During proper operation of the main bearings, each main bearing 12, 14 supports the shaft 10 and the rotor 8 relatively to the stator 6 around the axis of rotation X-X. In this case, none of the auxiliary bearings 30, 32 support the shaft 10 and the secondary bearings 16, 18 contribute to supporting the shaft 10. In this case, the shaft extends at a radial distance from the auxiliary bearings 30, 32.

When the rotor 8 and the shaft 10 are driven at a speed of rotation located in the secondary range of speeds of the first secondary bearing 16 and second secondary bearing 18, during a failure of the main bearings 12, 14, the shaft 10 is first of all only supported by the associated secondary bearing 16, 18, but is not in contact with the auxiliary bearings 30, 32. Thus, at high speeds of rotation, the auxiliary bearings 30, 32 cannot be damaged since the shaft extends at a radial distance from the auxiliary bearings (no contact), for reliable operation which is one of the goals of the invention.

Once the shaft 10 and the rotor 8 have been slowed down so that the speed of rotation is found in the auxiliary range of speeds of the auxiliary bearing 30, 32 and notably when the speed leaves the secondary range of speeds, only the auxiliary bearings 30, 32 support the shaft 10.

The secondary electrodynamic bearings 16, 18 are by design robust since there is never any contact regardless of the speed of rotation, unlike landing bearings with rolling elements. Thus, in the case of a failure of the main bearings, the operation is more reliable for a possible much higher number of slowdowns from a high speed, by means of the contactless electrodynamic secondary bearings 16, 18, and present technologies which use landing bearings with rolling elements. Indeed, electrodynamic bearings do not have any friction and any wear. Also, this is why the auxiliary landing bearings 30, 32 which are smooth bearings are better suitable for aggressive environmental conditions as described below.

Moreover, the motor according to the invention may operate under environmental conditions which an electric motor with landing bearings with rolling elements does not allow, like in the presence of humid gas, dirty gas or acid gas (notably the presence of $H_2S$, $CO_2$, Hg, etc.). This is another preferred objective the present invention in addition to reliable operation.

Figure 2:
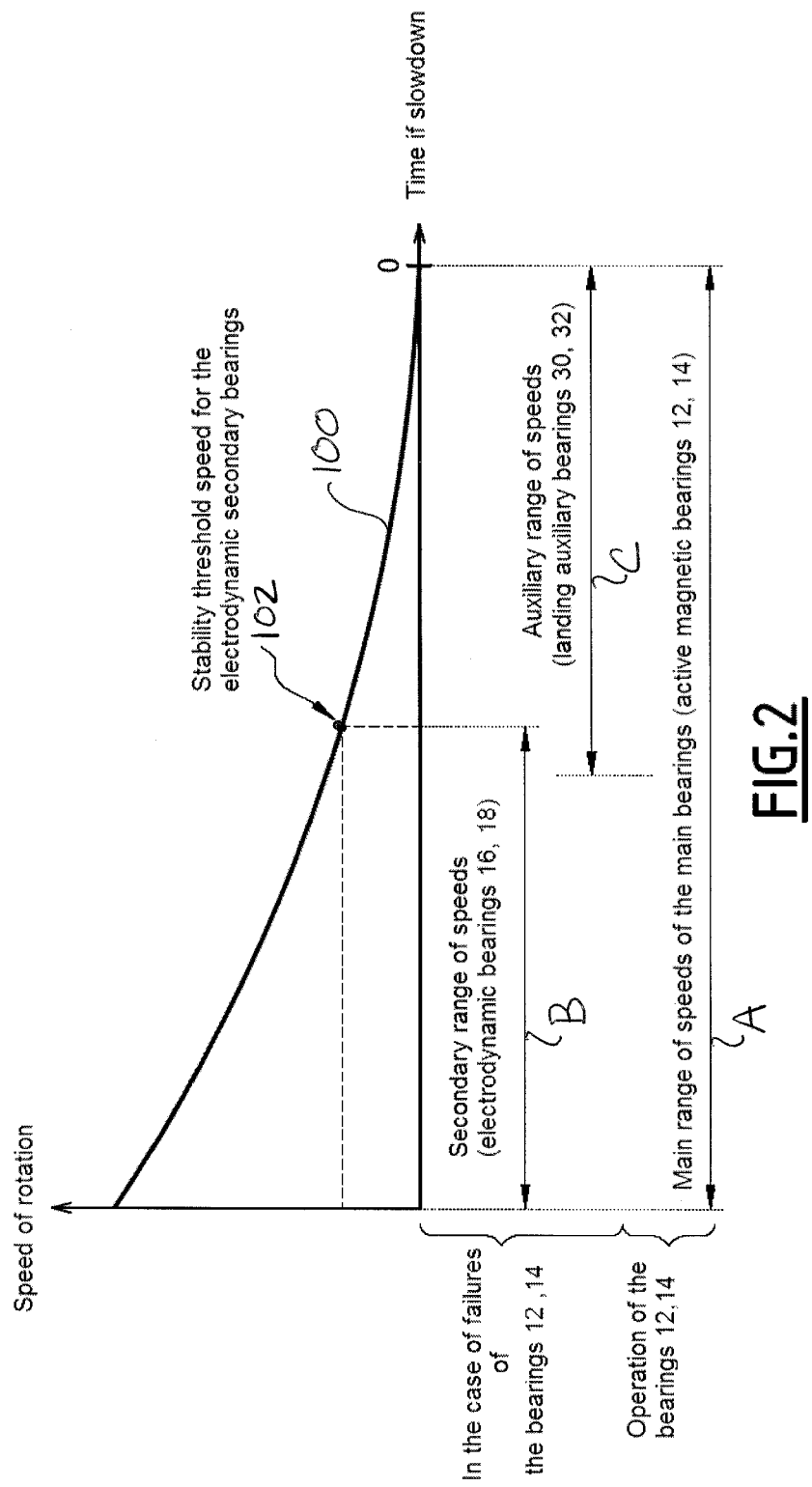
FIG. 2 shows the operating ranges of the different bearings of the motor according to the present invention.

FIG. 2 shows the operating ranges of the different bearings of the motor according to the present invention. Curve 100 shows the speed of rotation over time. A point 102 indicates a stability threshold speed for the electrodynamic secondary bearings. A main range of speeds A, a secondary range of speeds B and an auxiliary range of speeds C are shown. An upper limit of the auxiliary range of speeds C is greater than or equal to the stability threshold speed 102. A lower limit of the secondary range of speeds B is delimited by the stability threshold speed 102.

In an alternative not shown, each auxiliary bearing 30, 32 is offset from the secondary bearing 16, 18 so that the bearing ring 34 is axially offset from all the fixed elements 22 or 24.

Still alternatively, said or each auxiliary bearing 30, 32 comprises or is formed by one of the roller bearings.

Finally, the invention was described with reference to a motor. It may be applied to any rotating electric machine, for example a generator, an asynchronous or synchronous motor.

What is claimed is:

1. An electric machine comprising:
   at least one main bearing supporting a rotor relative to a stator, wherein the main bearing is disposed at an end of a shaft supporting the rotor;
   at least one secondary bearing configured to support the rotor relative to the stator when the main bearing becomes faulty, wherein the at least one secondary bearing includes a permanent magnet fixed to a casing of the electric machine and a moveable amagnetic electric conductor element fixed relative to the shaft and the rotor; and
   an auxiliary bearing disposed adjacent to the at least one secondary bearing, wherein the permanent magnet included in the at least one secondary bearing axially covers the auxiliary bearing;
   wherein the at least one secondary bearing is an electrodynamic bearing.

2. The electric machine according to claim 1, comprising two main bearings, each having a corresponding secondary bearing.

3. The electric machine according to claim 2, wherein the two main bearings are magnetic bearings.

4. The electric machine according to claim 1, wherein the at least one secondary bearing supports the shaft in a secondary range of speeds.

5. The electric machine according to claim 4, wherein the secondary range of speeds is delimited by a stability threshold speed as a low limit.

6. The electric machine according to claim 1, wherein the at least one auxiliary bearing is associated with the at least one main bearing, the at least one auxiliary bearing supporting the rotor relative to the stator in an auxiliary range of speeds different from the main range of speeds.

7. The electric machine according to claim 6, wherein the at least one auxiliary bearing is a smooth bearing.

8. The electric machine according to claim 7, wherein the smooth bearing includes a bearing ring or includes pads.

9. The electric machine according to claim 6, wherein the at least one auxiliary bearing includes at least one bearing with rolling elements.

10. The electric machine according to claim 6, wherein the at least one secondary bearing includes a crown attached to the rotor and two fixed elements.

11. The electric machine according to claim 10, wherein an upper limit of the auxiliary range of speeds is greater than or equal to a stability threshold speed.

12. The electric machine according to claim 6, wherein the at least one secondary bearing includes a crown attached to the rotor and two fixed elements, the crown includes the electric conductor element and each fixed element includes one of the at least one permanent magnets, and each auxiliary bearing includes a bearing ring.

13. The electric machine according to claim 6, wherein an upper limit of the auxiliary range of speeds is greater than or equal to a stability threshold speed.

14. The electric machine according to claim 1, wherein the at least one secondary bearing includes a crown attached to the rotor and two fixed elements, the crown including the electric conductor element and each fixed element including one of the at least one permanent magnets.

15. The electric machine according to claim 14, wherein both fixed elements are positioned on either side of the associated crown.

16. The electric machine according to claim 1, further comprising a first main bearing for supporting the rotor relative to the stator in a main range of speeds, a first auxiliary bearing associated with the first main bearing, the first auxiliary bearing and the first main bearing supporting the rotor relative to the stator in an auxiliary range of speeds different from the main range of speeds.

17. The electric machine according to claim 16, wherein an upper limit of the auxiliary range of speeds is greater than or equal to a stability threshold speed.

* * * * *